(12) United States Patent
Price

(10) Patent No.: US 7,984,006 B2
(45) Date of Patent: Jul. 19, 2011

(54) LEARNING A USER'S ACTIVITY PREFERENCES FROM GPS TRACES AND KNOWN NEARBY VENUES

(75) Inventor: Robert R. Price, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 700 days.

(21) Appl. No.: 11/857,425

(22) Filed: Sep. 18, 2007

(65) Prior Publication Data

US 2009/0073033 A1    Mar. 19, 2009

(51) Int. Cl.
    *G06N 5/02*    (2006.01)
(52) U.S. Cl. .................................................. 706/46
(58) Field of Classification Search .................... 706/46
     See application file for complete search history.

(56) References Cited

U.S. PATENT DOCUMENTS

| | | |
|---|---|---|
| 6,513,532 B2 | 2/2003 | Mault et al. |
| 6,571,193 B1 | 5/2003 | Unuma et al. |
| 6,879,969 B2 | 4/2005 | Engstrom et al. |
| 6,925,452 B1 | 8/2005 | Hellerstein et al. |
| 7,080,322 B2 | 7/2006 | Abbot et al. |
| 7,085,818 B2 | 8/2006 | Brown et al. |
| 7,117,075 B1 | 10/2006 | Larschan et al. |
| 7,171,304 B2 | 1/2007 | Wako |
| 2002/0188589 A1 | 12/2002 | Salmenkaita |

FOREIGN PATENT DOCUMENTS

WO    0208854 A2    1/2002

OTHER PUBLICATIONS

Takeuchi et al ("An outdoor recommendation system based on user location history" ubipcmm 2005).*
Takeuchi et al ("An Intelligent City Guide with a "Metal Detector" Interface" UIST 2006).*
Park et al ("Location-Based Recommendation System Using Bayesian User's Preference Model in Mobile Devices" Jul. 2007).*
Setten et al ("Context-Aware Recommendations in the Mobile Tourist Application COMPASS" Aug. 2004).*
Takeuchi, Yuichiro et al., "City Voyager: An Outdoor Recommendation System Based on User Location History", pp. 625-636, School of Frontier Sciences, The University of Tokyo.
Joon Yeon Choi, Hong Joo Lee et al.,"Context-Aware Recommendations on the Mobile Web", pp. 143-151, Graduate School of Management, Korea Advanced Institute of Science and Technology.
Daniel Ashbrook and Thad Starner, Using GPS to Learn Significant Locations and Predict Movement Across Multiple Users, In Personal and Ubiquitous Computing, vol. 7, No. 5, Oct. 2003, pp. 275-286.
John Krumm and Eric Horvitz, Predestination: Inferring Destinations from Partial Trajectories, Eighth International Conference on Ubiquitous Computing (UbiComp-2006), Sep. 2006.

* cited by examiner

*Primary Examiner* — Jeffrey A Gaffin
*Assistant Examiner* — Lut Wong
(74) *Attorney, Agent, or Firm* — Park, Vaughan, Fleming & Dowler LLP; Shun Yao

(57) ABSTRACT

A method for inferring activities to a user is provided. The system receives at least one location trace and corresponding contextual information. The system then derives a set of venues based on a venue database, wherein a respective hypothetical visit is associated with the contextual information corresponding to the location trace. The system derives a set of activity types associated with a context based on the venues, the corresponding context indicated by the location trace, and a venue-to-activity mapping. In addition, the system receives a user query context and identifies a number of activity types of which the associated contextual information is similar to the user query context. The system further weights a respective identified activity type based on its associated context's similarity to the user query context, normalizes weights associated with each identified activity type, and produces an activity-type probability distribution, thereby facilitating inferring activities associated with the user.

21 Claims, 5 Drawing Sheets

| USER ID | LATITUDE | LONGITUDE | TIME STAMP |
|---|---|---|---|
| 16 | 37.44115257 | -122.17197890 | 1175380861000 |
| 16 | 37.44110000 | -122.17203500 | 1175380876000 |
| 16 | 37.44110000 | -122.17203500 | 1175380892000 |
| 16 | 37.44110000 | -122.17203500 | 1175380907000 |
| 16 | 37.44072392 | -122.17222304 | 1175380922000 |

LEARNING A USER'S ACTIVITY PREFERENCES FROM GPS TRACES AND KNOWN NEARBY VENUES

BACKGROUND

1. Field of the Invention

The present disclosure relates to a recommender system. More specifically, the present disclosure relates to a technique that improves recommendations for a user by learning the user's activity preferences from unlabeled location traces (such as GPS readings) associated with the user's past activities and a set of records containing information about venues (such as restaurants, offices, etc) in the area where the GPS traces are recorded.

2. Related Art

In today's technologically-oriented society, a primary source of information is recommender systems. The purpose of most recommendation systems is to help individuals discover items they might not necessarily be able to find on their own. Such a recommender system can generate personalized recommendations in response to a query from a user. Effective recommendations often depend on how accurately the system can estimate a user's needs and preferences. Some systems, such as online shopping sites, use user surveys or a user's past selections to derive such information. However, it would be difficult to gather this information in a system with limited access to a user's selection history, or where user surveys are difficult to obtain.

SUMMARY

One embodiment of the present invention provides a method for inferring activities to a user. During operation, the system receives at least one location trace and corresponding contextual information. The system then derives a set of venues based on a venue database, wherein a respective hypothetical visit is associated with the contextual information corresponding to the location trace. The system further derives a set of activity types associated with a context based on the venues, the corresponding context indicated by the location trace, and a venue-to-activity mapping. In addition, the system receives a user query context and identifies a number of activity types of which the associated contextual information is similar to the user query context. The system further weights a respective identified activity type based on its associated context's similarity to the user query context, normalizes weights associated with each identified activity type, and produces an activity-type probability distribution, thereby facilitating inferring activities associated with the user.

In a variation of this embodiment, the context indicated by the location trace includes one or more of: a location, an indication of a time of a day or a time range; an indication of a day of a week or a range of days of a week; and an indication of a weather condition.

In a variation of this embodiment, the query context includes one or more of: a location; a time; a day of a week; and a weather condition.

In a variation of this embodiment, the location trace includes a set of coordinates with corresponding time stamps.

In a variation of this embodiment, deriving the set of venues involves identifying a location based on one or more locations indicated by the location trace within a time period and identifying a number of venues in the vicinity of the identified location based on the venue database.

In a further variation, the venue database indicates a number of venues and their corresponding coordinates.

In a variation of this embodiment, the system pools activity-type-to-context mappings associated with multiple, similar users by explicitly clustering similar users or by using latent-variable methods to implicitly cluster similar users.

Figure 1:
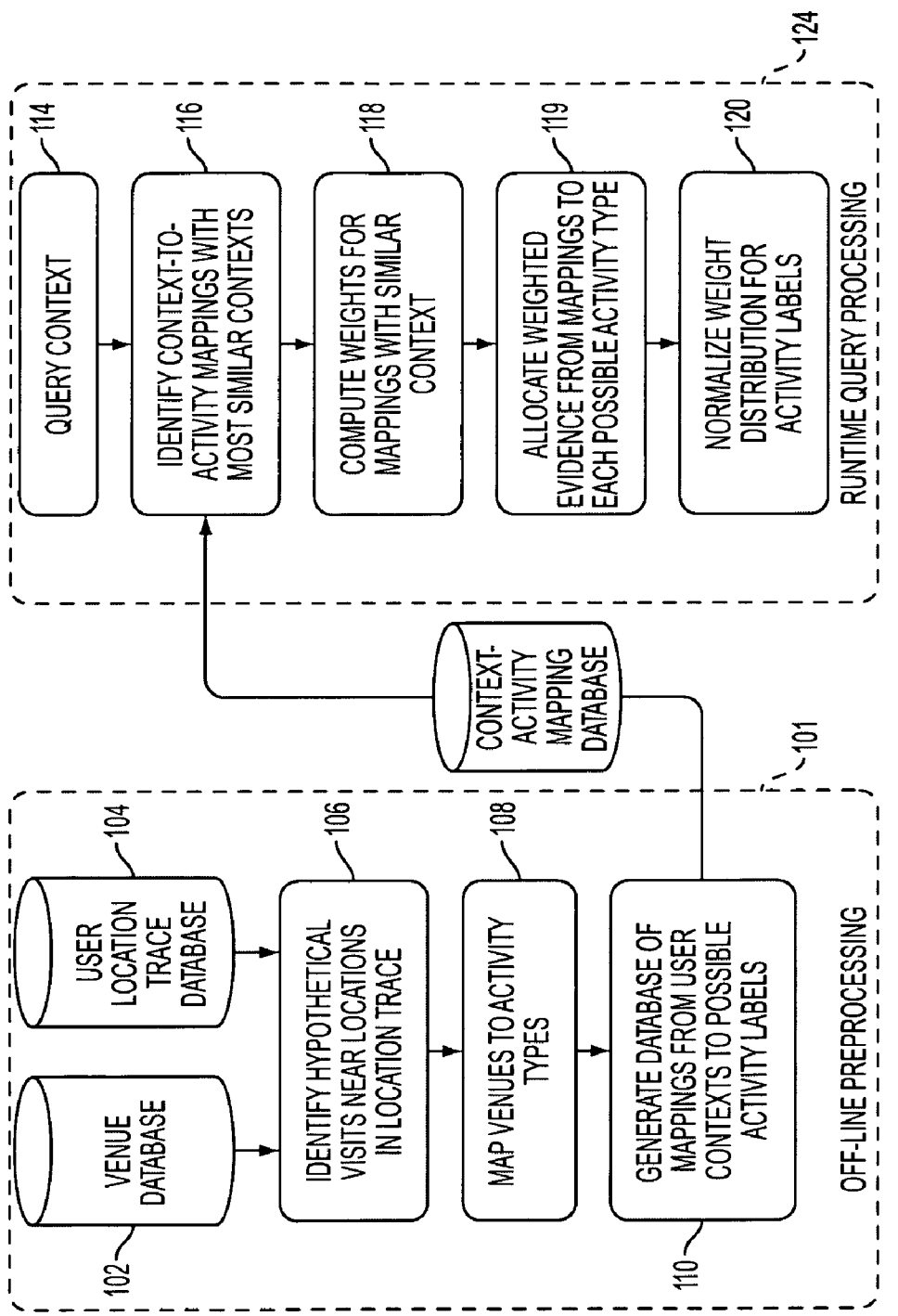
FIG. 1 presents a block diagraph illustrating an exemplary operation model for a leisure activity that facilitates activity-type learning based on GPS traces in accordance with one embodiment of the present invention.

TABLE I presents three exemplary labels extracted from GPS traces taken on different days in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), Application-Specific Integrated Circuits (ASICs), Field Programmable Gate Arrays (FPGAs), or other media capable of storing computer readable media now known or later developed.

Overview

Embodiments of the present invention provide a method for inferring a user's intended leisure activity from context variables. The intended activity can be used by a recommender system to focus recommendations on the most relevant items. The success of such leisure activity recommender system typically depends on how closely the recommended items match the user's personal interests and preferences in a given context, such as a certain time of day, a particular day of week, specific weather conditions, etc. One way to collect this information is to conduct user surveys which allow a user to answer explicit questions regarding his personal interests and habits. However, to be useful, such surveys are often overly detailed and burdensome to the user. As a result, the user may have a frustrating experience and become reluctant to use the recommender system. Another method is to use a machine learning technique to find patterns in a dataset of possible user contexts hand-labeled with summary activity descriptions. A context including variables such as time of day and weather might be labeled with an activity such as "eating indoors". The hand labeling of user contexts is time consuming and prone to error.

Embodiments of the present invention provide a method for predicting user's activity preferences and habits without using surveys or requiring hand labeled examples to learn from. Like a learning system, the method attempts to learn associations between measurable variables describing the user's current situation or context and the activities the user is likely to prefer in these contexts. However, this method does not receive explicit activity labels for user contexts, so it must infer these indirectly. The system receives sensor-generated location measurements, such as Global Positioning System (GPS) coordinates, a set of venue descriptions, and a mapping between venue descriptions (e,g, "restaurant") and activities supported by this venue type (e.g., "eating"). Using the location information associated with the context, the system infers a distribution over possible activities the user might be intending from the activity labels associated with venues near the location where the context variables were measured. As a result, the system can obtain a set of activity labels, which indicate activity types and attributes and which are associated with different context. These activity labels are subsequently used to process a user's query, so that the recommended activities can better match the user's preferences.

System Operation

In general, the operation of the present system can be divided into two parts: an off-line preprocessing operation and a runtime query processing operation. During the off-line processing, the system collects a user's location traces, identifies hypothetical visits to various venues, and maps the venues to activity types. A mapping is then created between the context associated with the location and the inferred activity mapping. In our present embodiment, we also use the same inference process to infer specific attributes of an activity such as "eating at a non-smoking venue". During the runtime query processing, the system computes an activity distribution based on the query context, and the stored context to activity type mappings.

FIG. 1 presents a block diagram illustrating an exemplary operation model for a leisure activity that facilitates activity-type learning based on location traces in accordance with one embodiment of the present invention. In this example, the system performs off-line preprocessing of the location traces over a period of time after the user's location data is collected. A venue database 102 and a user location trace database 104 provide the data to the system.

Venue database 102 stores the venue information, which can include a venue's location, the venue's type, and certain attributes associated with the venue. For example, the venue types can include restaurant, theater, sports facility, park, etc., Venue attributes can include, for example, the type of cuisine served at a restaurant, the types of films played at a movie theater, the theme of a bar, the types of goods offered at a shop, etc.

Location trace database 104 stores multiple location traces for one or more users. In one embodiment, a user's hand held device which provides the leisure activity recommendation application also includes a GPS unit. Thus, the same handheld device can generate a location trace, which includes records of location and time, for the user. Optionally, the hand held device can periodically upload these location traces to user location trace database 104.

During the off-line preprocessing operation 101, the system receives one or more location traces for a user, as well as the venue information from venue database 102. The system then analyzes the location traces, identifies locations along these traces where the user appears to have spent at least some time, and identifies the venues in the vicinity of those locations. That is, the system identifies hypothetical visits to different venues near locations in the location trace (operation 106).

In some embodiments, the system faces several challenges in the process of generating these hypothetical visits. Typically, a GPS trace represents a trajectory of a user's movement. A consumer-grade GPS unit generally has a limited spatial resolution. For example, the GPS signal may not be sufficiently detailed to distinguish which side of the street the user is on. Furthermore, the user may be in an urban area with a high building density, and may experience inaccurate GPS signals due to signal reflections off building surfaces. In one embodiment, the system "smooths" the GPS trace by considering "clusters" of locations during a certain time period and searching for venues in the vicinity of this cluster of locations. This way, the system can statistically remove the "noise" in the GPS traces and derive the desired activity information over a longer period, over multiple traces.

In another embodiment, GPS signals are smoothed using statistical processes such as a Kalman smoother.

Another issue associated with GPS signals is their limited time resolution. Typically, a GPS unit updates its location information at certain intervals, such as every 10 seconds. However, when the user is in a busy district, he may enter a shop or a subway station during this interval and lose the GPS signal. As a result, the GPS trace would be incomplete. In one embodiment, the system performs an interpolation process that fills in likely sample locations during these sensor dropouts.

In one embodiment, the system also receives contextual information associated with a location trace. Such contextual information can include the day of week and a current weather condition. This information is used by the system to further qualify an activity type and later used in conjunction with a query context when the system is handling a user query.

Next, the system identifies significant locations in the location trace (operation 106). In doing so, the system identifies locations (or location clusters) where the user appears to have spend a substantial amount of time. For example, the system can search for locations at which the user remains for more than 5 minutes. Other time thresholds are also possible.

After identifying these locations, the system then searches the venue information to identify venues within the vicinity of the significant location or location cluster. For example, the system can search all the venues within 120 feet of a location, or a location range. In one embodiment, the location can be represented by a longitude/latitude pair or a pair of longitude/latitude ranges. The venues identified in the vicinity of such a location are then considered to be hypothetical visits.

The system then maps the venues to activity types (operation 108). Note that in one embodiment the system maintains a set of mappings that convert a venue to an activity type. For example, restaurants are mapped to the "eat" activity type, theaters are mapped to the "see" activity type, and gyms are mapped to the "do" activity type. The system can adopt any activity-type categorization scheme.

In addition to mapping a venue to an activity type, the system can optionally extract attributes of the venue and associate those attributes to the activity type and contextual information. For example, a take-out restaurant may have an attribute of "take out," as opposed to "dine in." This attribute can then be associated with the user's contextual information, for example the time of the day which can be, say, 12 pm, and/or a weather condition such as sunny or rainy. Later, when the same user makes a query for activities around noon while the weather is sunny, the system would know that one of the activities the user could enjoy is to order take-out food for lunch. The probability of the user actually preferring take-out food for lunch when the weather is sunny, is computed by a statistical process described below.

Note that there can be a number of venues and, correspondingly, a number of hypothetical visits to these venues associated with one location. This does not mean that a user can simultaneously visit multiple venues. The system uses these hypothetical visits to derive an activity distribution associated with a particular location and a set of contextual data. For example, if there are three restaurants, two bars, and one department store located in the vicinity of a specific location, and the corresponding time stamp points to 5 pm on a Saturday, the system may derive that there is a 50% chance that the user is eating, a 33% chance that the user is drinking, and a 17% chance that the user is shopping at 5 pm on a Saturday. In one embodiment, the system also takes the distance of the venue from the location measured for the user into account when calculating the probability that the user is engaged in the activity associated with the venue.

Subsequently, the system generates a set of activity labels (operation 110). Each activity label is associated with a location, and can include a distribution of various activity types. In addition, an activity label can specify a set of associated contextual information, such as time of day, day of week, and weather condition.

Note that for the same user, the system typically performs the off-line pre-processing as described above on multiple GPS traces and obtains a number of activity labels. Some of these labels would be associated with similar contextual information. As a result, the system can learn that certain contextual information is more likely to be correlated with certain types of activities and/or activity attributes. The process is most effective when there are multiple independent samples of the user's behavior such as contexts measured on different calendar dates in different parts of the city but sharing contextual variables such as time of day or current weather conditions.

TABLE I presents three exemplary labels extracted from location traces taken on different days in accordance with one embodiment of the present invention. Each label indicates an activity-type distribution based on the hypothetical visits, and a set of contextual information which in this case includes the time of day and day of week. Although the system cannot derive which activity is more likely to occur based on a single label, the system can nevertheless derive that the user is more likely to be eating around 12:00 pm during the weekdays. Note that the labels shown in TABLE I are only simplified examples. In an actual system, each label may contain more information. A label may contain more activity types, and each activity type may be associated with one more attributes. For example, the "eating" activity type may be associated with cuisine type, restaurant type, price range, and so forth. Each label may also include much more detailed contextual information, such as local traffic condition,

TABLE I

Relevant Contexts to Activity Label Inferences

| Location and Context | Hypothetical Visits to Nearby Venues | Inferred Activity |
| --- | --- | --- |
| Location = x1, y1; time = 12:00 pm; day = Monday | Jo's Restaurant, Sam's Bookstore | Eating 50%; Shopping 50% |
| Location = x2, y2; time = 12:10 pm; day = Tuesday | Happyville School, Pete's Restaurant | Studying 50%; Eating 50% |
| Location = x3, y3; time = 12:05 pm; day = Thursday | Sally's Restaurant, Bill's Auto garage | Eating 50%; Driving 50% |

Note that the above location trace analysis is typically performed off-line. When a user submits a query for leisure activities, the system performs the runtime query processing 124. During runtime query processing 124, the system receives the user's query context 114. Query context 114 may include contextual information such as location, time of day, day of week, weather conditions, etc.

After receiving the user's current query context 114, the system searches a set of "context to activity label mappings" produced by the offline process for this user to find the mappings with contexts that are most similar to the user's current query context (operation 116). In the current embodiment, the similarity of the user's current context to contexts associated with mappings is calculated based on a multi-attribute distance metric defined over context variables. In other words, the system computes a logical "distance" between the mapping's context and the query's context. The system can employ different ways to compute this logical distance. For example, if the contextual information of interest is time of day, the system may use the difference in minutes as the logical contextual distance. In other embodiments, the system may use the actual physical distance between the mapping context's location and the user's query context location as the logical contextual distance. Other definitions of context similarity are also possible. In other embodiments, context to activity label mappings for other users can also be weighted in to provide user's whose interests fall into similar categories to benfit from data collected on other members of the same class.

The relevant contexts each provide predictions about the probability of various possible activities. The system now computes weights to combine the predictions for the relevant contexts previously retrieved (operation 118). In one embodiment, the system assigns a weight to each mapping based on the similarity metric or logical distance between the user's query context 114 and the mapping's context. In one embodiment, the system can uses a modified reciprocal like function which properly handles zero distance as the weight for an activity label.

The system then allocates evidence from the mappings with the most similar contexts to each of the possible activity types (operation 119). One method of doing this is captured as follows. Let $m_i$ be the $i^{th}$ relevant mapping and $m_i(a)$ be an indicator function which returns 1 if activity a is predicted by mapping i and zero otherwise; and $w_i$ be the weight based on a function of the similarity of the mapping's context to the user's current context. Then e(a), the evidence for activity a would be:

$$e(a) = \sum_i w_i m_i(a).$$

Subsequently, the system normalizes the weighted evidence to create a distribution over the user's intended activity type (operation 120).

$$Pr(a) = \frac{e(a)}{\sum_a e(a)}$$

Other ways of generating the activity type distribution are also possible.

A recommender system can recommend leisure activities based on the normalized activity type distribution produced by function 120 to improve the effectiveness of its recommendations. For example, if the system determines that a user query submitted in a context where the time is 12:00 pm on a Tuesday, then the activity type distribution might be 60% eating, 20% shopping, and 20% exercising. A recommender system could use this distribution to return 6 recommendations of restaurants, two recommendations of shops, and two recommendations of local gyms and completely eliminate museum recommendations from the list, thus showing the user what he or she is most likely interested in and saving the user from searching through irrelevant recommendations.

Location Traces

Figures 2, 3:
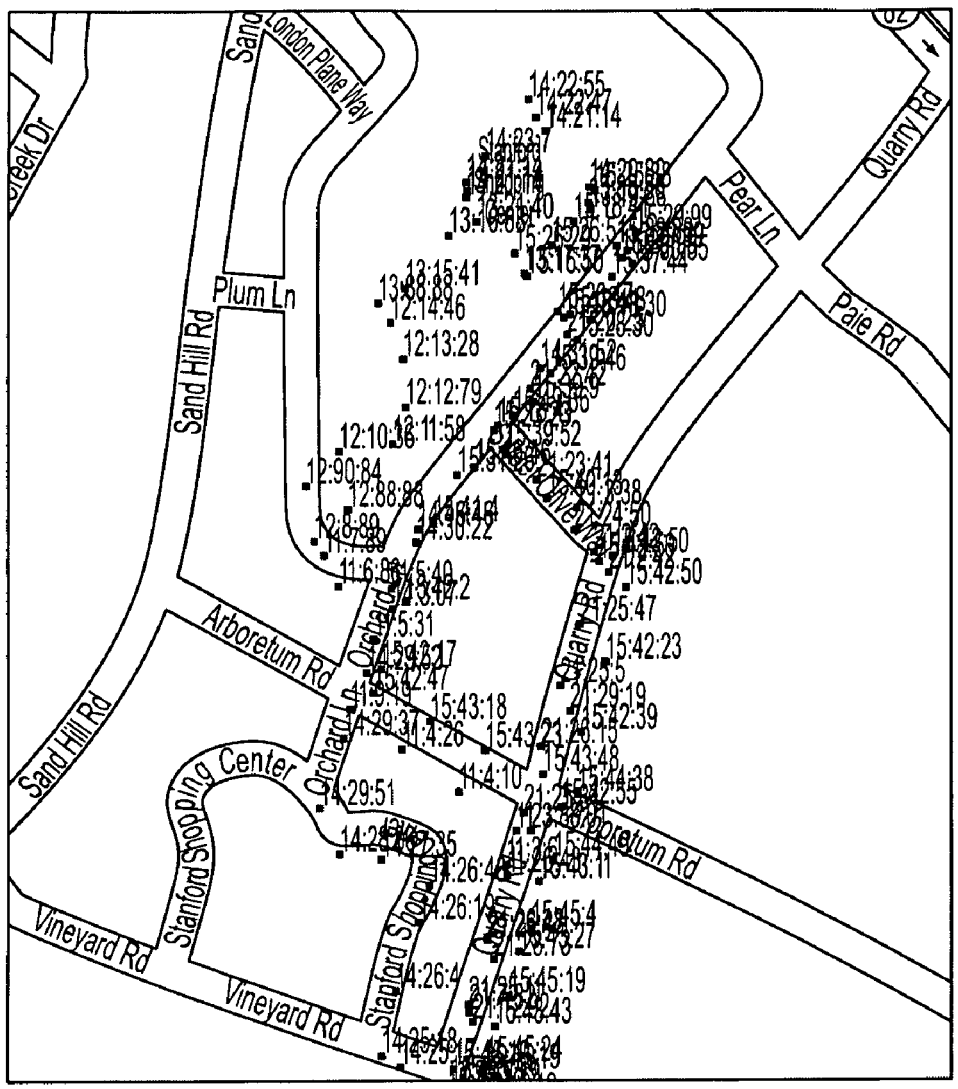
FIG. 2 illustrates a mapping of an exemplary GPS trace on a map in accordance with one embodiment of the present invention.
FIG. 3 illustrates a portion of an exemplary GPS trace that stores a user's location and time information in accordance with one embodiment of the present invention.

FIG. 2 illustrates a mapping of an exemplary location trace on a map in accordance with one embodiment of the present invention. As shown in this example, a location trace indicates a number of points which can be represented spatially on a map. During certain time, there are more GPS data points concentrated in a specific location, indicating that the user is spending a substantial amount of time in that area In other parts of FIG. 2, the data points are sparser, which indicates that the user is only passing by those places. During the activity type analysis process, the system can filter out the sparse data points and focus on the clustered data points, which indicate the locations where the user is spending most of his time. When the location signal is known to have been interrupted a predictive model can be used to interpolate likely location samples missing from the trace.

FIG. 3 illustrates a portion of an exemplary location trace that stores a user's location and time information in accordance with one embodiment of the present invention. In one embodiment, each location trace data point includes a user identifier, a latitude, a longitude, and a time stamp indicating the time when the user was at the location specified by the latitude/longitude pair.

Venue Information and Activity Labels

Figure 4:
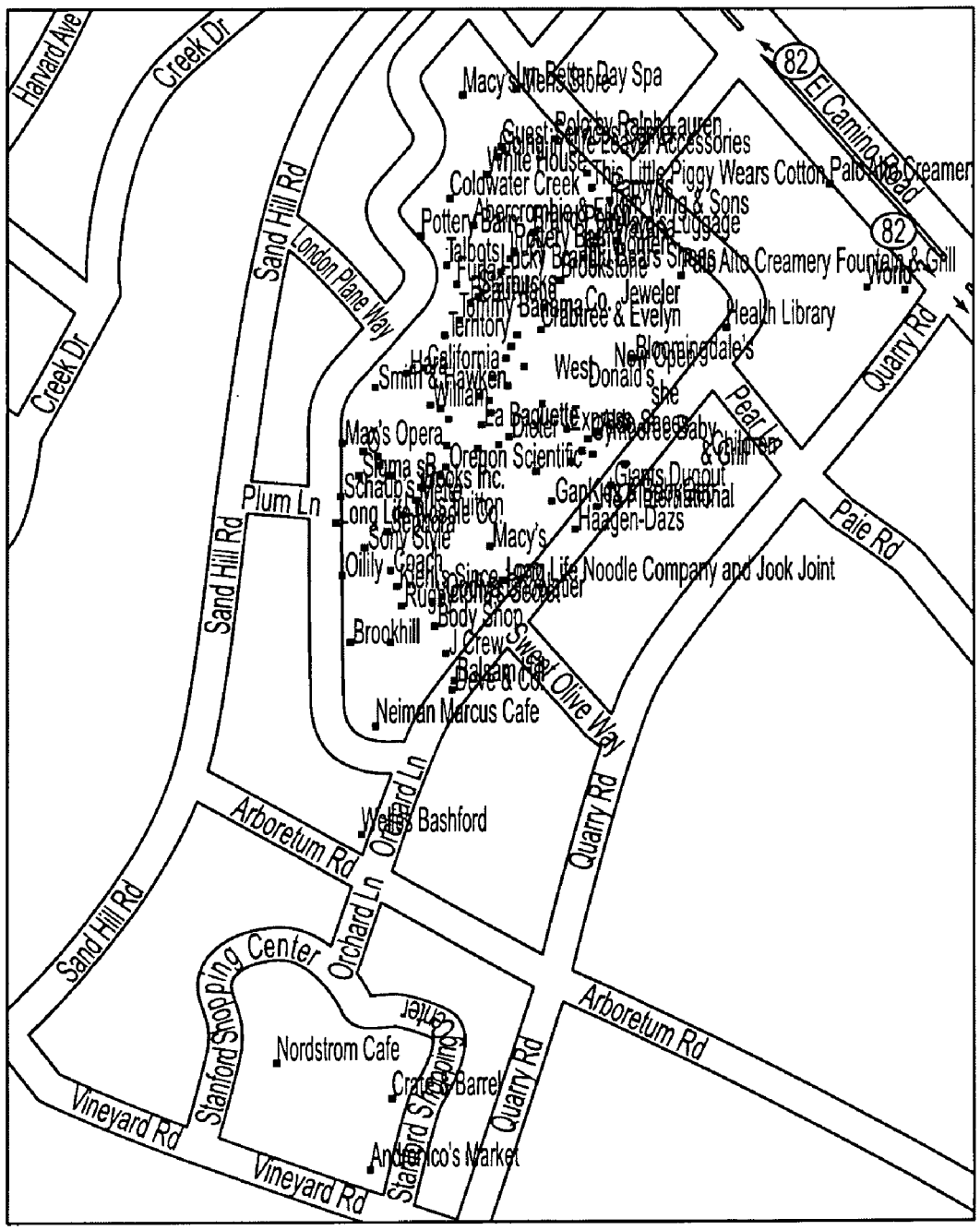
FIG. 4 illustrates a portion of the data stored in a venue database mapped onto a map in accordance with one embodiment of the present invention.

FIG. 4 illustrates a portion of the data stored in a venue database represented spatially on a map in accordance with one embodiment of the present invention. In this example, a large number of venues are displayed over a map. Each venue is indicated by its location, which is presented by a black dot, and the venue's name. In the actual venue database, each venue entry may include a venue type (e.g., restaurant, museum), a latitude/longitude pair to indicate its location, a venue name, a brief venue description, and optionally one or more venue attributes (e.g. cuisine types, smoking/non smoking). The actual format of the stored venue data may vary from system to system. Other data formats are also possible.

Figure 5:
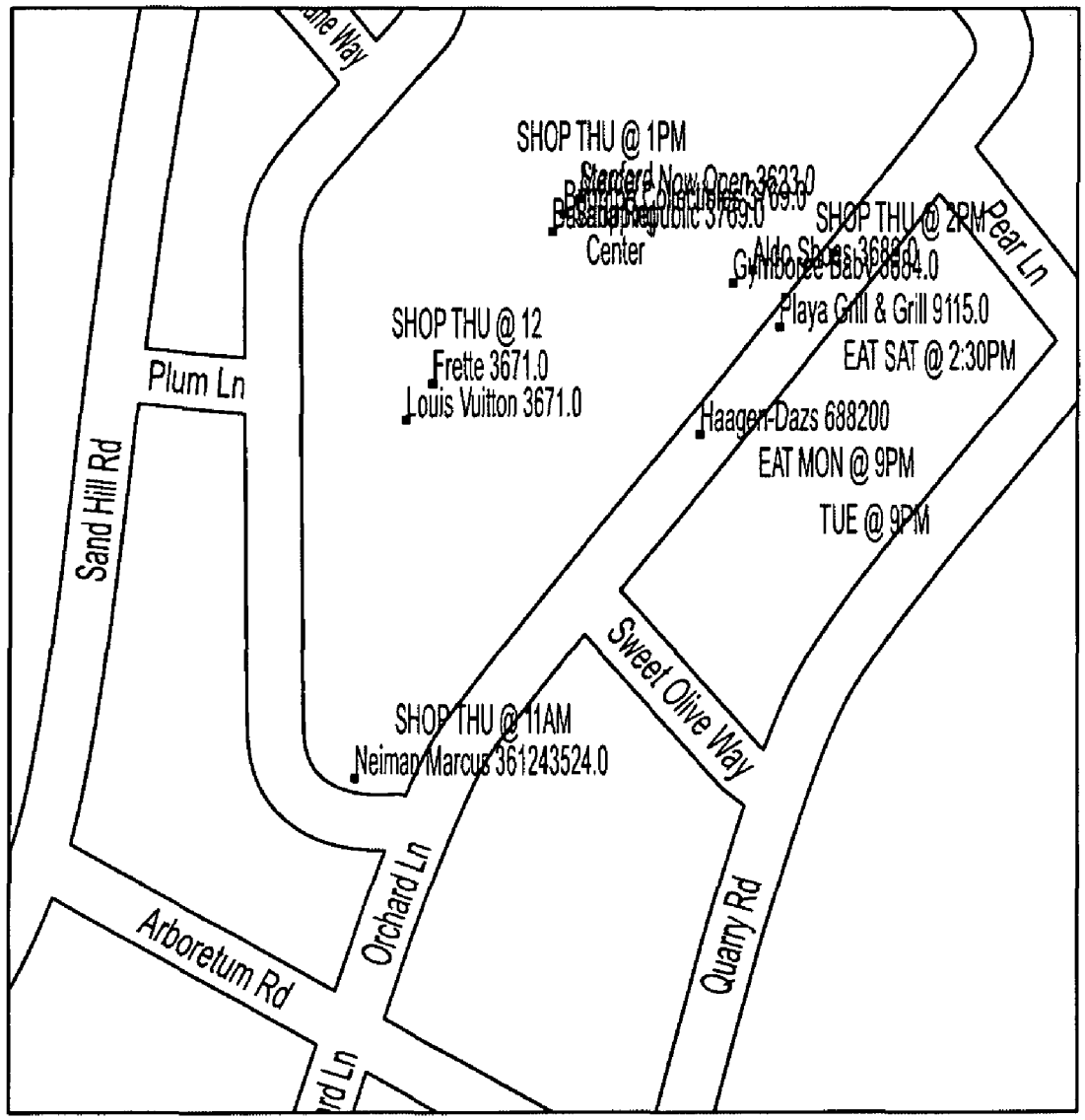
FIG. 5 illustrates a set of activity labels mapped onto a map in accordance with the present invention.

FIG. 5 illustrates a set of activity labels represented spatially on a map in accordance with the present invention. As shown on the map in FIG. 5, each context to activity mapping specifies context variables such as location, a day of week, and a time of day as well as an activity type. Note that in practice, a context to activity label mapping can include more than one activity type implicitly specifying an unnormalized probability distribution among all the activity type at that location. Furthermore, the context to activity mapping can include more contextual information, such as weather conditions.

Computer and Communication System

Figure 6:
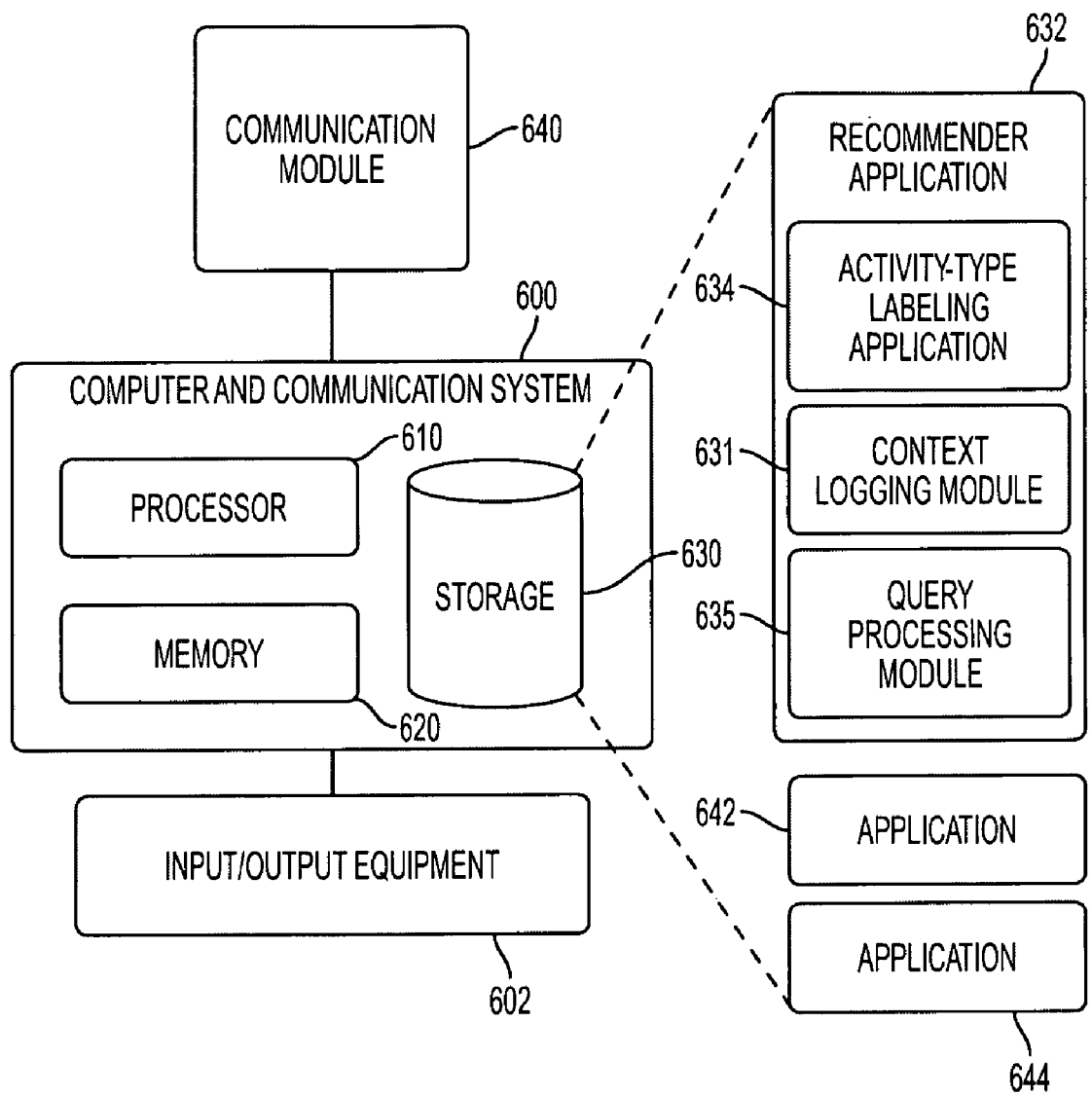
FIG. 6 illustrates an exemplary computer and communication system which facilitates learning of activity types using GPS traces in accordance with the present invention.

FIG. 6 illustrates an exemplary computer and communication system which facilitates learning of activity types using location traces in accordance with the present invention. A computer and communication system 600 is coupled to a communication module 640 and input/output equipment 602, and includes a processor 610, a memory 620, and a storage device 630. Storage device 630 stores a recommender application 632, as well as other applications such as applications 642 and 644. In one embodiment, recommender application 632 includes an activity-type labeling application 634, a context logging module 631, and a query processing module 635.

During operation, recommender application 632 is loaded from storage device 630 into memory 620 and executed by processor 610. Processor 610 executes the context logging module 631 which receives reports of user context information and stores them in 630; an activity-type labeling application 634 which converts stored contexts into mappings from contexts to activity distributions in an off-line manner; and executes the query processing module 635 in real time when a user submits a query.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for inferring activities associated with a user, the method comprising:
    receiving a cluster of locations that indicates a location trace of the user during a period of time and corresponding context;
    smoothing the location trace, which involves statistically removing a first subset of locations from the location cluster, and interpolating a second subset of locations into the location cluster;
    deriving a set of venues based on the location cluster from a venue database, wherein a visit to a respective venue is identified as a hypothetical visit responsive to the venue being located within a location range which includes the received location cluster and being associated with the corresponding context;
    deriving a set of activity types associated with the venues from a venue-to-activity mapping;
    associating attributes of the venues to the activity types based on the corresponding context;
    identifying a subset of the activity types of which the associated attributes are similar to a query context;
    assigning a weight to each identified activity type based on similarity between its attributes and the query context; and
    producing a probability distribution of various activity types based on the subset of the activity types and their weights, wherein the probability distribution predicts likelihoods that the user engages in each identified activity type associated with the query context and the location.

2. The method of claim 1,
wherein the context indicated by the location trace includes one or more of:
  a location;
  an indication of a time of a day or a time range;
  an indication of a day of a week or a range of days of a week; and
  an indication of a weather condition.

3. The method of claim 1,
wherein the query context, comprises:
  a location;
  a time;
  a day of a week; and
  a weather condition.

4. The method of claim 1,
wherein the location trace includes a set of coordinates with corresponding time stamps.

5. The method of claim 1,
wherein deriving the set of venues comprises:
  identifying a location based on one or more locations indicated by the location trace within a time period; and
  identifying a number of venues in the vicinity of the identified location based on the venue database.

6. The method of claim 1,
wherein the venue database indicates a number of venues and their corresponding coordinates.

7. The method of claim 1,
further comprising pooling activity-type-to-context mappings associated with multiple, similar users by explicitly clustering similar users or by using latent-variable methods to implicitly cluster similar users.

8. A non-transitory computer readable storage medium storing instructions which when executed by a computer cause the computer to perform a method for inferring activities associated with a user, the method comprising:
  receiving a cluster of locations that indicates a location trace of the user during a period of time and corresponding context;
  smoothing the location trace, which involves statistically removing a first subset of locations from the location cluster, and interpolating a second subset of locations into the location cluster;
  deriving a set of venues based on the location cluster from a venue database, wherein a visit to a respective venue is identified as a hypothetical visit responsive to the venue being located within a location range which includes the received location cluster and being associated with the corresponding context;
  deriving a set of activity types associated with the venues from a venue-to-activity mapping;
  associating attributes of the venues to the activity types based on the corresponding context;
  identifying a subset of the activity types of which the associated attributes are similar to a query context;
  assigning a weight to each identified activity type based on similarity between its attributes and the query context; and
  producing a probability distribution of various activity types based on the subset of the activity types and their weights, wherein the probability distribution predicts likelihoods that the user engages in each identified activity type associated with the query context and the location.

9. The computer readable storage medium of claim 8,
wherein the context indicated by the location trace includes one or more of:
  a location;
  an indication of a time of a day or a time range;
  an indication of a day of a week or a range of days of a week; and
  an indication of a weather condition.

10. The computer readable storage medium of claim 8,
wherein the query context comprises:
  a location;
  a time;
  a day of a week; and
  a weather condition.

11. The computer readable storage medium of claim 8,
wherein the location trace includes a set of coordinates with corresponding time stamps.

12. The computer readable storage medium of claim 8,
wherein deriving the set of venues comprises:
  identifying a location based on one or more locations indicated by the location trace within a time period; and
  identifying a number of venues in the vicinity of the identified location based on the venue database.

13. The computer readable storage medium of claim 8,
wherein the venue database indicates a number of venues and their corresponding coordinates.

14. The computer readable storage medium of claim 8,
wherein the method further comprises pooling activity-type-to-context mappings associated with multiple, similar users by explicitly clustering similar users or by using latent-variable methods to implicitly cluster similar users.

15. A computer system for recommending leisure activities to a user, the computer system comprising:
  a memory;
  a processor;
  a location trace receiving mechanism that receives a cluster of locations that indicates a location trace of the user during a period of time and corresponding context;
  a location trace smoothing mechanism that smoothes the location trace, which involves statistically removing a first subset of locations from the location cluster, and interpolating a second subset of locations into the location cluster;
  a location trace preprocessing module coupled to the processor that:
    derives a set of venues based on the location cluster from a venue database, wherein a visit to a respective venue is identified as a hypothetical visit;
    responsive to the venue being located within a location range which includes the received location cluster and being associated with the corresponding context;
    derives a set of activity types associated with the venues from a venue-to-activity mapping; and
    associates attributes of the venues to the activity types based on the context; and
  an inferring mechanism coupled to the processor that:
    identifies a subset of the activity types of which the associated attributes are similar to a query context;
    assigns a weight to each identified activity type based on similarity between its attributes and the query context; and
    produces a probability distribution of various activity types based on the subset of the activity types and their weights, wherein the probability distribution predicts likelihoods that the user engages in each identified activity type associated with the query context and the location.

16. The computer system of claim 15,
wherein the context indicated by the location trace includes one or more of:
   a location;
   an indication of a time of a day or a time range;
   an indication of a day of a week or a range of days of a week; and
   an indication of a weather condition.

17. The computer system of claim 15,
wherein the query context comprises:
   a location;
   a time;
   a day of a week; and
   a weather condition.

18. The computer system of claim 15,
wherein the location trace includes a set of coordinates with corresponding time stamps.

19. The computer system of claim 15,
wherein while deriving the set of venues, the location trace preprocessing module is further configured to:
   identify a location based on one or more locations indicated by the location trace within a time period; and
   identify a number of venues in the vicinity of the identified location based on the venue database.

20. The computer system of claim 15,
wherein the venue database indicates a number of venues and their corresponding coordinates.

21. The computer system of claim 15,
further comprising a pooling mechanism configured to pool activity-type-to-context mappings associated with multiple, similar users by explicitly clustering similar users or by using latent-variable methods to implicitly cluster similar users.

* * * * *